Figure 1:
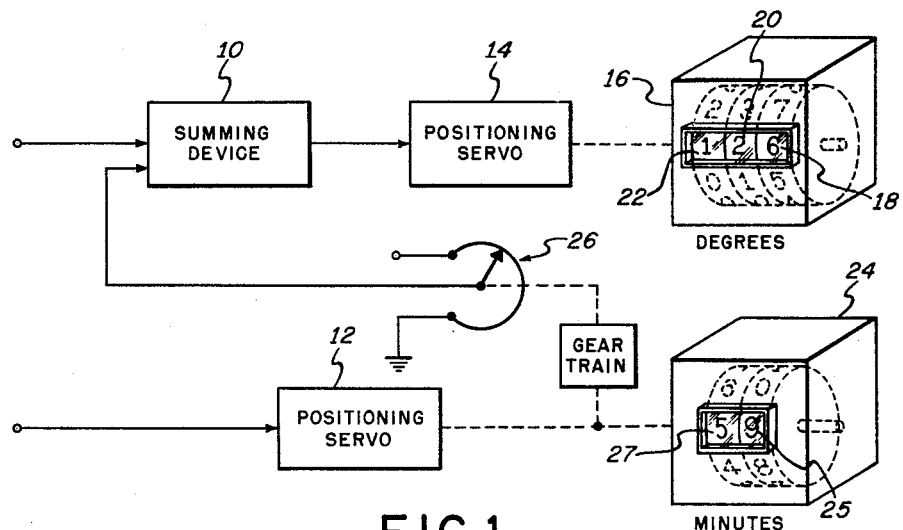

INVENTOR
RICHARD L. MEIROWITZ

United States Patent Office 3,007,637
Patented Nov. 7, 1961

3,007,637
COARSE-FINE COUNTER
Richard L. Meirowitz, Hicksville, N.Y., assignor to Sperry Rand Corporation, Great Neck, N.Y., a corporation of Delaware
Filed Mar. 22, 1960, Ser. No. 16,773
8 Claims. (Cl. 235—92)

This invention relates generally to indicating apparatus and more particularly to apparatus which unambiguously displays a coarse and a fine measure of data.

A coarse and a fine measure of data are both necessary to display accurately the amount that an input shaft to a data transmission system is rotated. Generally, a coarse and a fine measure of data are supplied by a two speed, or channel, data transmission system. One channel, called the coarse channel, of a typical two speed data transmission system, is provided with a data transmitter whose shaft is driven directly by the shaft whose rotation is to be indicated. This coarse channel data transmitter transmits data representing the rotation of its shaft to a coarse channel data receiver. The second channel, called the fine channel, is also provided with a data transmitter whose shaft is driven directly by the shaft whose rotation is to be indicated. This fine channel data transmitter, however, does not transmit to a fine channel data reeciver data representing the rotation of its shaft, but transmits data representing its shaft rotation multiplied by a constant. For example, with the above-mentioned constant equal to 60, and with the shaft of the fine channel data transmitter being rotated through one degree, the data received by the fine channel data receiver will cause the shaft of that receiver to rotate through 60 degrees. With the shaft of the data receiver in each channel capable of being positioned by its received data to within the same tolerance, e.g., ±6 minutes, the shaft of the fine channel data receiver is positioned 60 times more accurately than the shaft of the coarse channel data receiver.

The reason for this is that the data receivers in both channels have their shafts positioned to within the same tolerance for different amounts of shaft rotation. That is, the positioning accuracy of the coarse channel data receiver is 6 minutes in $n$ degrees whereas the positioning accuracy of the fine channel data receiver is 6 minutes in $60n$ degrees or 6 seconds in $n$ degrees. The output shafts of the coarse and fine channel data receiver are then coupled respectively to coarse and fine positioning servos which respectively drive counters, such as a degree and a minute counter, to indicate the amount that the input shaft has rotated.

Though the fine channel data represents the transmission system's input shaft rotation to a closer approximation than the coarse channel data, it is impractical to utilize the fine channel data alone to drive a single counter having degree and minute counting wheels geared to the same shaft. This is because the possibility of error in increments of 6 degrees exists. Also, the shaft of the counter would have to turn through 60 revolutions for each degree that the shaft of the data transmission system is rotated through. This greatly increases the wear on the counter elements and the servo response times for step input signals. With both coarse and fine channel data being utilized (and fed to separate indicating devices), the shaft of the fine counter will go through 60 revolutions for each degree that the input shaft to the data transmission system goes through only if the input shaft is turning at a reasonably low rate. Otherwise, the coarse counter will immediately go to the position dictated by the coarse data and the fine counter will, at about the time the coarse counter stops running, go to the position dictated by the fine data.

The reason for this is as follows: With the system input shaft rapidly turning, the shaft of the fine channel data receiver tries to follow the system's input shaft together with the shaft of the coarse channel data receiver; however, as soon as the fine channel data receiver shaft starts to move in one direction, the fine data dictates a reversal in the direction of rotation of the fine channel data receiver shaft. Therefore, the shaft of the fine channel data receiver remains still until the system input shaft slows down, i.e. when the shaft of the coarse channel data receiver settles down to the position dictated by the coarse data. Also, in the event that the single counter (which is driven by the fine channel data alone) is used to display a number representing the position of the input shaft to the system, i.e. a number between 000°00′ and 359°59′, another problem arises. That is, in the event power to the data transmitter is interrupted, the display on the counter could possibly be in error by multiples of 6 degrees. For example, if the power is interrupted just along enough for the input shaft to the system to move through 6 degrees, the shaft of the fine channel data receiver, which should have gone through 360 degrees, will be in exactly the position it should be in when power is turned back on. Hence, the display on the counter will remain as it was and will be in error by 6 degrees.

Though a coarse and a fine channel are necessary in data transmission systems to display accurately the amount an input shaft is rotated, they themselves create an ambiguous display (when separate coarse and fine counters are employed) each time the fine data has completed a cycle. For example, in using a degree and a minute counter, respectively the coarse and the fine counter, ambiguity in reading the display arises at the time that the minutes reading approaches sixty minutes. At this time the degree reading appears to be a full degree greater than it actually is. For instance, in displaying 38°59′ and 39°00′, the minutes counter respectively will display 59′ and 00′ for the two situations, but the degree counter will display 39° in both cases.

To overcome this problem, various complex mechanical and electromechanical arrangements have been proposed and used. However, because of their complexity, and because of their accompanying prohibitive cost, these complex arrangements often are not utilized, except in certain military equipment where cost is not a factor.

In addition to the complex arrangements proposed, it has been proposed that the ambiguity problem might be simply and inexpensively overcome by adding to the coarse counter a hidden counting wheel which turns at the same rate as the shaft of the fine counter. The added counting wheel could then discretely turn the lowest order degree wheel at the completion of each of its revolutions. However, such a system would also present an ambiguous display because the coarse data which is accurate to within only 6 minutes could switch the coarse display to its next higher degree a full 6 minutes before it should.

The present invention provides a simple, inexpensive indicator which unambiguously displays coarse and fine data. In general, a signal representing a fine measure of data is fed to a positioning servo which drives a counter, hereafter called the fine counter. Also driven by the positioning servo is a sawtooth voltage generator whose output voltage rises and falls linearly when the fine counter respectively counts in ascending and descending order. The output signal from the sawtooth voltage generator is fed to a summing device together with a signal representing a coarse measure of the data. The summing device then operates to subtract this sawtooth voltage generator output signal from the signal representing the coarse measure of the data. The output signal from the summing device is then fed to a positioning servo which drives a counter, hereafter called the coarse counter. At the instant the fine counter completes its range of counts, e.g. in a counter of minutes, when the count goes from 59 to zero, the sawtooth voltage generator output signal goes to zero and the summing device output signal is representative of only the coarse measure of the data. Since the coarse counter at this time is displaying a count which is in error by the full range of the fine counter, an error signal exists at the input to the coarse positioning servo. This error signal then causes the coarse positioning servo to drive the coarse counter to its next position.

The present invention may also be embodied in apparatus which permits the count to approach zero, or some other value, from either of two directions. For instance, in a latitude indicator, the latitude notation may approach 000°00', i.e. the equator, from either a northerly or southerly direction. To permit the previously described apparatus to unambiguously display such a situation, a circuit is added which senses when the data approaches zero, i.e. the equator. In close proximity to zero, the coarse data is removed, leaving only the fine data. The fine data then operates to reverse (at precisely zero degrees zero minutes) the polarity of the signals to the summing device and the fine positioning servo back to the polarity the signals had before crossing the equator. This thereby causes the coarse and fine positioning servos to drive the notation on the counters in an opposite, or ascending, direction.

Accordingly, it is a prime object of the present invention to provide apparatus which unambiguously displays a coarse and a fine measure of data.

It is another object of the present invention to provide apparatus which utilizes simple, inexpensive counting devices to unambiguously display a coarse and a fine measure of data.

Yet another object of the invention is to provide apparatus which unambiguously displays a coarse and fine measure of data on simple, inexpensive counters while, at the same time, indicating which side of zero the count is on.

Figure 2:
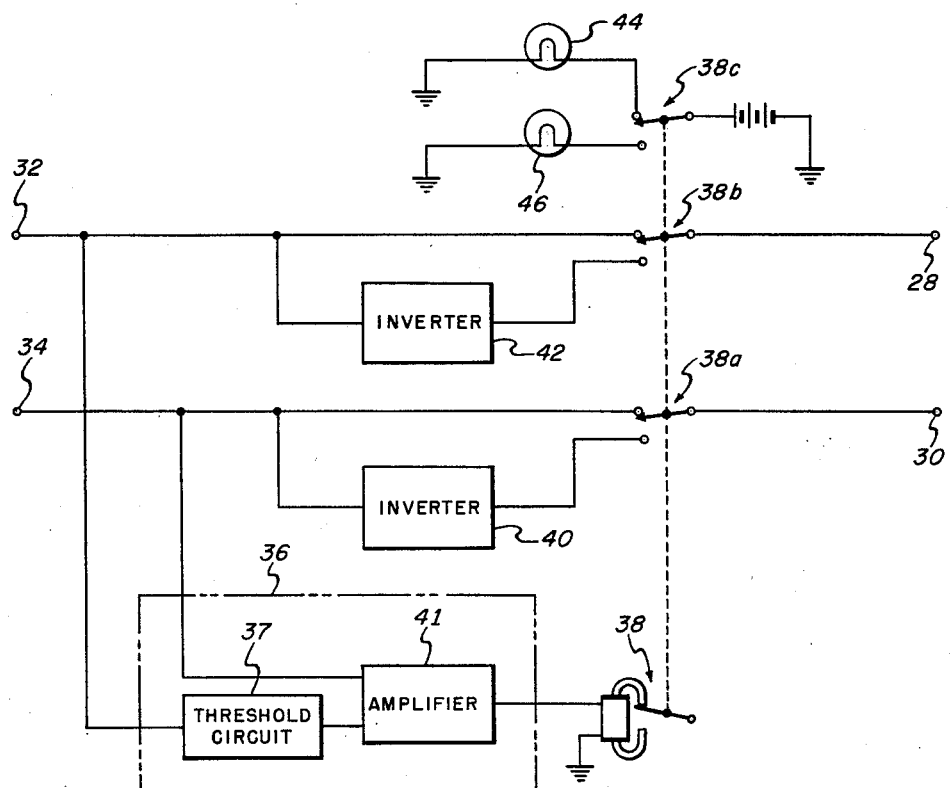

The invention will be described with reference to the accompanying drawings, wherein:

FIG. 1 is a schematic block diagram of a simplified embodiment of the present invention, said embodiment being a degree and minute counter; and FIG. 2 is a schematic block diagram of apparatus which, when utilized with the embodiment shown in FIG. 1, allows that embodiment to be utilized as a latitude or longitude indicator.

Referring to FIG. 1, a summing device 10 receives a signal representative of a coarse measure of data and a positioning servo 12 receives a signal representative of a fine measure of the same data. Connected to receive the output signal from the summing device 10 is a positioning servo 14. A counter 16 is mechanically coupled to and driven by the positioning servo 14. The counter 16 in this form of the invention displays units, tens and hundreds of degrees respectively on the counting wheels 18, 20 and 22. The positioning servo 12 has mechanically connected to it a counter 24. The counter 24, in this form of the invention, displays the number of minutes that the coarse data has advanced between degrees and is therefore numbered from zero to fifty-nine. The counter 24 is provided with counting wheels 25 and 27 which respectively count units and tens of minutes. Positioning servos 12 and 14 are each provided with suitable gearing which drive the counting wheel 25 through 6 complete rotations for each complete rotation of the counting wheel 18. Each time the counting wheel 18 completes a revolution, it mechanically drives the counting wheel 20 to its next higher position. In like manner, the counting wheels 20 and 25 respectively cooperate with the counting wheels 22 and 27.

The positioning servo 12, in addition to driving the counter 24, drives the wiper of potentiometer 26 through suitable gearing. The gearing causes the wiper to rotate through 360 degrees for each 60 minutes indicated on the counter 24. The potentiometer 26 has applied across it a voltage which exactly equals the voltage necessary at the input to the servo 14 to have that servo drive the counting wheel 18 to its next higher position. The voltage on the wiper of the potentiometer 26 is coupled to the summing device 10. As the wiper of the potentiometer 26 is rotated through 360 degrees, the voltage on the wiper linearly rises to a maximum and then falls rapidly off to zero in sawtooth fashion. This occurs precisely at zero minutes.

In operation, a signal representative of a coarse measure of data is applied to the summing device 10. A signal representative of a fine measure of the data is also applied to the positioning servo 12. The positioning servo 12 starts to drive the counter 24 and at the same time causes an increasing voltage to appear on the wiper of potentiometer 26. This voltage is applied to the summing device 10 wherein it is subtracted from the signal representing the coarse measure of the data. If the coarse measure of the data, as represented by a signal voltage, is at some intermediate point between units counts, the position of and the voltage on the wiper of potentiometer 26 are both at a corresponding intermediate point. Therefore, when the signal voltage on the wiper is subtracted from the signal representing the coarse measure of the data, a summing device 10 output signal results which is always representative of a discrete value on the counter 18. The summing device 10 output signal is then fed to the positioning servo 14 to drive the counter 16 to indicate this discrete value.

Referring to FIG. 2, the terminals 28 and 30 are respectively coupled to the summing device 10 and the positioning servo 12, shown in FIG. 1, in place of the input lines to those elements. Signals representative of a coarse measure of data are coupled to terminal 32 and signals representative of a fine measure of the data are coupled to terminal 34. A synchronizing circuit 36 is coupled to receive the signals present on terminals 32 and 34. The synchronizing circuit 36 includes a threshold or dead space device 37, which receives only coarse data signals, and an operational amplifier 41. A typical form of dead space device is shown in FIG. 6.23C, page 292, Electronic Analog Computers, Korn and Korn, McGraw-Hill Publishing Company, 1956. The output signals from the dead space device are applied to the operational amplifier 41 together with signals representing the fine data. The dead space device operates to prohibit the coarse data signals from having any effect on the output of the operational amplifier when the input data is very close to zero degrees zero minutes. This closeness to zero degrees zero minutes is slightly more than the maximum expected error in the coarse data. At zero degrees zero minutes, the fine data changes polarity and, because the fine data alone is in control, so does the output of the amplifier 41. When, for example, the apparatus of FIG. 2 is utilized to enable the apparatus of FIG. 1 to operate at a latitude counter, the amplifier 41 produces a polarized output voltage, the polarity of which is determined by which side of zero degrees zero minutes, i.e. the equator, the input signals represent. However, the point at which the polarity reverses is determined solely by the fine data. Coupled to receive the output signal from the synchronizing circuit 36 is a polarized relay 38. The relay 38 moves switches 38a, 38b and 38c simultaneously from their upper positions to their lower positions or from their lower positions to their upper positions each time the synchronizing circuit 36 changes the polarity of its output signal. The upper contacts of switches 38a and 38b are respectively coupled to terminals 32 and 34 and the lower contacts of switches 38a and 38b are respectively coupled to inverters 40 and 42 which operate to reverse the polarity of the signals present on terminals 32 and 34. The input ends of the inverters 40 and 42 are respectively coupled to terminals 34 and 32. The lamps 44 and 46 are respectively lighted when the switch 38c moves to its upper and lower positions, thereby indicating which side of zero the count is on, e.g. whether at a north or south latitude.

In operation, with switches 38a, 38b and 38c in their upper positions and with signals representing coarse and fine latitude data respectively applied to terminals 32 and 34, the counters 16 and 24 of FIG. 1 unambiguously indicate the latitude as described above. Lamp 44 is lighted and indicates whether the signals present on terminals 32 and 34 represent north or south latitude data. Assuming that a lighted lamp 44 indicates a north latitude, and assuming that the signals present on terminals 32 and 34 represent latitude data which is decreasing in magnitude, i.e. approaching the equator, the counters 16 and 24 will register numbers which are decreasing in value. At the instant the signals present on terminals 32 and 34 represent zero degrees and zero minutes, i.e. the equator, the synchronizing circuit 36 reverses the polarity of its output signal. This reversal in polarity is sensed by relay 38 which moves switches 38a, 38b and 38c to their lower positions, thereby respectively passing the signals representing the fine data through inverter 40, passing the signals representing the coarse data through inverter 42, and lighting lamp 46 to indicate a south latitude. Since the latitude data, as represented by signals, is reversed in polarity as the data goes through zero degrees, zero minutes, reversal of the polarity of the signals in inverters 40 and 42 causes the counters 16 and 24 to cease counting in descending order and to start counting in ascending order.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. Apparatus for unambiguously indicating on a coarse and a fine counter the exact value of a quantity, comprising means producing a signal representing the difference between two input signals, said means receiving a signal representing a coarse measure of the quantity, first positioning servo means coupled to receive the output signal from said means producing a signal representing the difference between two input signals, first counting means coupled to and driven by said first positioning servo means to indicate a coarse measure of the quantity, second positioning servo means receiving a signal representing a fine measure of the quantity, second counting means coupled to and driven by said second positioning servo means to indicate a fine measure of said quantity, and means producing and applying a signal representing the count of said second counting means to said means producing a signal representing the difference between two input signals.

2. Apparatus for unambiguously indicating on a coarse and a fine counter the exact value of a quantity comprising means producing a signal representing the difference between two input signals, said means receiving a signal representing a coarse measure of the quantity, first positioning servo means coupled to receive the output signal from said means producing a signal representing the difference between two input signals, first counting means coupled to and driven by said first positioning servo means to indicate a coarse measure of the quantity, second positioning servo means receiving a signal representing a fine measure of the quantity, second counting means coupled to and driven by said second positioning servo means to indicate a fine measure of said quantity, and means generating a signal which exactly equals the change in the coarse measure signal when said coarse measure signal changes by an amount less than that amount which is necessary to change the coarse indication by a single unit, said means being coupled to said means producing a signal representing the difference between two input signals.

3. The apparatus of claim 2 wherein said means generating a signal which exactly equals the change in the coarse measure signal when said coarse measure signal changes by an amount less than that amount which is necessary to change the coarse indication by a single unit is a potentiometer having applied across it a potential which exactly equals the potential necessary to change the coarse indication by a single unit, said potentiometer being provided with a wiper positionable by said second positioning servo means and coupled to said means producing a signal representing the difference between two input signals.

4. Apparatus for unambiguously indicating on a coarse and a fine counter the exact value of a quantity, said quantity being capable of approaching zero from both a positive and a negative direction, comprising means producing a signal representing the difference between two input signals, said means receiving a signal representing a coarse measure of the quantity, first positioning servo means coupled to receive the output signal from said means producing a signal representing the difference between the two input signals, first counting means coupled to and driven by said first positioning servo means to indicate a coarse measure of the quantity, second positioning servo means receiving a signal representing a fine measure of the quantity, second counting means coupled to and driven by said second positioning servo means to indicate a fine measure of said quantity, means producing and applying a signal representing the count of said second counting means to said means producing a signal representing the difference between two input signals, and means coupled to the input circuits of said second positioning servo means and said means producing a signal representing the difference between two input signals, said means being responsive when the signals representing the coarse and the fine measures of the quantity simultaneously go through zero to invert the polarity of both of said signals.

5. Apparatus for unambiguously indicating on a coarse and a fine scale the exact value of quantity, comprising means producing a signal representing the difference between two input signals, said means receiving a signal representing a coarse measure of the quantity, first positioning servo means coupled to receive the output signal from said means producing a signal representing the difference between two input signals, first counting means coupled to and driven by said first positioning servo means to indicate a coarse measure of the quantity, second positioning servo means receiving a signal representing a fine measure of the quantity, second counting means coupled to and driven by said second positioning servo means to indicate a fine measure of said quantity, means generating a signal which exactly equals the change in coarse measure signal when said coarse measure signal changes by an amount less than that amount which is necessary to change the coarse indication by a single unit, said means being coupled to said means producing a signal representing the difference between two input signals, and means coupled to the input circuits of said second positioning servo means and said means producing a signal representing the difference between two input signals, said means being responsive when the signals representing the coarse and the fine measures of the quantity simultaneously go through zero to invert the polarity of both said signals.

6. The apparatus of claim 5 wherein said means driven by said second positioning servo means is a potentiometer having applied across it a potential which exactly equals the potential necessary to change the coarse indication by a single unit, said potentiometer being provided with a wiper positionable by said second positioning servo means and coupled to said means producing a signal representing the difference between two input signals.

7. Apparatus for unambiguously indicating on a coarse and a fine counter the exact value of quantity, comprising means producing a signal representing the difference between two input signals, said means receiving a signal representing a coarse measure of the quantity, first positioning servo means coupled to receive the output signal from said means producing a signal representing the difference between two input signals, first counting means coupled to and driven by said first positioning servo means to indicate a coarse measure of the quantity, second positioning servo means receiving a signal representing a fine measure of the quantity, second counting means coupled to and driven by said second positioning servo means to indicate a fine measure of said quantity, means producing and supplying a signal representing the count of said second counting means to said means producing a signal representing the difference between two input signals, relay means, and means coupled to the input circuits of said second positioning servo means and said means producing a signal representing the difference between two input signals, said means being responsive when the signals representing the coarse and the fine measures of the quantity simultaneously go through zero to actuate said relay means to invert the polarity of both said signals.

8. Apparatus for unambiguously indicating on a coarse and a fine counter the exact value of a quantity comprising means producing a first signal the magnitude of which represents a coarse measure of said quantity, means producing a second signal the magnitude of which represents a fine measure of said quantity, said second signal rising and falling periodically in sawtooth fashion when the magnitude of said first signal increases, means receiving both said signals subtracting said second signal from said first signal, means receiving the output signal from said subtracting means indicating a first count representing the instantaneous magnitude of that signal, and means responsive to indicate a second count representing the instantaneous magnitude of said second signal.

References Cited in the file of this patent

UNITED STATES PATENTS

| | | |
|---|---|---|
| 2,614,237 | Goertz | Oct. 14, 1952 |
| 2,764,720 | Kelling | Sept. 25, 1956 |
| 2,847,660 | Baldwin et al. | Aug. 12, 1958 |
| 2,930,030 | Hirose | Mar. 22, 1960 |